US 6,610,795 B2

(12) United States Patent
Hayes

(10) Patent No.: US 6,610,795 B2
(45) Date of Patent: Aug. 26, 2003

(54) PROCESS TO PRODUCE POLY(ALKYLENE ETHER) GLYCOL-CONTAINING POLYESTERS

(75) Inventor: Richard Allen Hayes, Brentwood, TN (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/927,653

(22) Filed: Aug. 10, 2001

(65) Prior Publication Data

US 2003/0032763 A1 Feb. 13, 2003

(51) Int. Cl.$^7$ .............................................. C08F 20/00
(52) U.S. Cl. ....................... 525/444; 528/275; 528/296; 528/300; 528/302; 528/308; 528/308.6; 525/437
(58) Field of Search ................. 528/275, 296, 528/300, 302, 308, 308.6; 525/437, 444

(56) References Cited

U.S. PATENT DOCUMENTS

| | | |
|---|---|---|
| 3,023,192 A | 2/1962 | Shivers |
| 3,243,413 A | 3/1966 | Bell et al. |
| 3,558,557 A | 1/1971 | Hrach et al. |
| 3,651,014 A | 3/1972 | Witsiepe |
| 3,663,653 A | 5/1972 | Frohlich et al. |
| 3,701,755 A | 10/1972 | Sumoto et al. |
| 3,763,109 A | 10/1973 | Witsiepe |
| 3,766,146 A | 10/1973 | Witsiepe |
| 3,775,374 A | 11/1973 | Wolfe, Jr. |
| 3,784,520 A | 1/1974 | Hoeschele |
| 3,801,547 A | 4/1974 | Hoeschele |
| 3,880,976 A | 4/1975 | Sumoto et al. |
| 4,136,715 A | 1/1979 | McCormack et al. |
| 4,156,774 A | 5/1979 | Buxbaum et al. |
| 4,251,652 A | 2/1981 | Tanaka et al. |
| 4,262,114 A | 4/1981 | Wagener et al. |
| 4,315,882 A | 2/1982 | Hiratsuka et al. |
| 4,355,155 A | 10/1982 | Nelsen |
| 4,467,595 A | 8/1984 | Kramers |
| 4,562,232 A | 12/1985 | Smith |
| 4,581,420 A | 4/1986 | Smith |
| 4,670,498 A | 6/1987 | Furusawa et al. |
| 4,906,714 A | 3/1990 | Cripps |
| 4,906,729 A | 3/1990 | Greene et al. |
| 4,968,778 A | 11/1990 | Still et al. |
| 4,970,275 A | 11/1990 | Still et al. |
| 5,128,185 A | 7/1992 | Greene |
| 5,331,066 A | 7/1994 | Takanoo et al. |

FOREIGN PATENT DOCUMENTS

| | | |
|---|---|---|
| EP | 974611 | 1/2000 |
| EP | 0 974 611 A2 | 4/2000 |
| GB | 1 500 577 | 2/1978 |

*Primary Examiner*—Samuel A. Acquah

(57) ABSTRACT

A process for producing a polyester that comprises 1 to 90 wt. % poly(alkylene ether) glycol. The process comprises the step of copolymerizing (i) a preformed polyester polymer having an inherent viscosity of at least 0.4 dL/g, (ii) a poly(alkylene ether) glycol, and (iii) a dicarboxylic acid or anhydride, to obtain a polyester comprising 1 to 90 wt. % poly(alkylene ether) glycol).

20 Claims, No Drawings

PROCESS TO PRODUCE POLY(ALKYLENE ETHER) GLYCOL-CONTAINING POLYESTERS

BACKGROUND OF THE INVENTION

Polyesters which incorporate poly(alkylene ether) glycols are well known within the art. Said polyesters are typically produced by adding the poly(alkylene ether)glycols at the beginning of the polyester polymerization stage. For example, Shivers, in U.S. Pat. No. 3,023,192, teaches the production of segmented copolyetherester elastomers, which incorporate poly(alkylene ether)glycols, by adding the poly(ethylene glycol) to dimethyl terephthalate, ethylene glycol and catalysts followed by polymerization. Further art teachings of similar production processes include, for example, U.S. Pat. Nos. 3,243,413, 3,558,557, 3,651,014, 3,701,755, 3,763,109, 3,766,146, 3,784,520, 3,880,976, 4,136,715, 4,262,114, 4,315,882, 4,467,595, 4,670,498, 4,906,729, and 4,906,714.

Occasionally, it has been generally taught that the poly (alkylene ether)glycol may be added to the polyester and incorporated through reesterification. For example, Frohlich, et al., in U.S. Pat. No. 3,663,653 teach that "Another possibility of preparing the block copolyesters of the invention consists in admixing the polytetrahydrofuran-diol to the polyester melt. Owing to a reesterification reaction the polytetrahydrofuran blocks are bound to the polyester through their hydroxyl terminal groups." (U.S. Pat. No. 3,663,653, column 2, lines 6–10). As an additional example, Wolfe, in U.S. Pat. No. 3,775,374, teaches that "Such prepolymers can also be prepared by a number of alternative esterification of ester interchange processes; for example, the long chain glycol can be treated with a high or low molecular weight short chain ester homopolymer or copolymer in the presence of catalyst until randomization occurs." (U.S. Pat. No. 3,775,374, column 4, lines 40–45). A similar teaching may be found by Hoeschele as taught in U.S. Pat. No. 3,801,547. As a further example, Buxbaum, et al., in U.S. Pat. Nos. 4,156,774 and 4,315,882, teach, "However, it is also possible to follow a procedure such that block polyesters are obtained by, for example, subjecting precondensates of homopolyesters (for example polyethylene terephthalate and polydiethylene glycol terephthalate) in appropriate quantity ratios to a polycondensation reaction, specifically on their own or together with a polyester of terephthalic acid and polybutylene glycol". As yet a further example, Tanaka, et al., in U.S. Pat. No. 4,251,652, teach that such polyesters may be prepared by "polycondensing at a temperature of from 210 to 270° C. at least one dicarboxylic acid and at least one diol to provide a polyester and then polycondensing the resultant polyester with TER-ATHANE® at a temperature from 200 to 250° C.". Nelsen, in U.S. Pat. No. 4,355,155, teaches that "the long chain glycol can be reacted with a high or low molecular weight short chain ester homopolymer". Greene, in U.S. Pat. No. 5,128,185, teaches "For example, long chain glycol can be reacted with high or low molecular weight short chain ester homopolymer or copolymer in the presence of catalyst until randomization occurs." However, none of these references exemplify such processes within their disclosures. They exemplify production processes through the monomeric species, as discussed above.

Rarely, it has been exemplified within the background art to produce said polyesters which incorporate poly(alkylene ether)glycols from the interaction of preformed polyesters with the poly(alkylene ether)glycols. For example, Still, et al., in U.S. Pat. Nos. 4,968,778 and 4,970,275, teach a process to produce polyesters which incorporate poly (alkylene ether)glycols which consists "of a low molecular weight polyester formed by the reaction of terephthalic acid and ethylene glycol (1:1.4 TA:EG)" combined with a poly (alkylene glycol)ether and catalysts followed by heating and finishing.

Takanoo, et al., in U.S. Pat. No. 5,331,066, teaches a process for the production of polyesters which incorporate poly(alkylene ether)glycols which comprises conducting polycondensation after or while melting and mixing a polyester polymer of 0.5 dL/g or more intrinsic viscosity and a polyether polymer having hydroxy groups at its terminals and having a number average molecular weight of 200 to 10,000. However, they further teach that "If the quantity of polyether is below one part by weight, desired polymer properties cannot be obtained, and if it is above 60 parts by weight, polyether extremely deteriorates and lowers in quality."

The present invention overcomes the shortcomings of the background art and provides a process to produce polyesters which incorporate 1 to 90 weight percent poly(alkylene ether)glycols while maintaining adequate thermal properties.

BRIEF SUMMARY OF THE INVENTION

The present invention provides a process for producing a polyester that comprises 1 to 90 wt. % poly(alkylene ether) glycol. The process comprises the step of copolymerizing (i) a preformed polyester polymer having an inherent viscosity of at least 0.4 dL/g, (ii) a poly(alkylene ether) glycol, and (iii) a dicarboxylic acid or anhydride, to obtain a polyester comprising 1 to 90 wt. % poly(alkylene ether glycol).

In one embodiment of the invention, the dicarboxylic acid comprises an unsubstituted or substituted aromatic, aliphatic, unsaturated, or alicyclic dicarboxylic acid having from 2 carbon atoms to 36 carbon atoms. In another embodiment, the anhydride comprises an unsubstituted or substituted aromatic, aliphatic, unsaturated, or alicyclic dicarboxylic anhydride having from 2 carbon atoms to 36 carbon atoms. In yet another embodiment of the invention, the dicarboxylic acid or anhydride has a concentration of 0.1 to 2 molar stoichiometric equivalents of said poly(alkylene ether) glycol.

In another embodiment, the process of the invention includes mixing and heating preformed polyesters with poly(alkylene ether) glycols and dicarboxylic acids or anhydrides, followed by standard finishing processes. The as produced polyesters which incorporate poly(alkylene ether) glycols of the present invention have been found to maintain comparable thermal stability to those produced by background art processes while emitting substantially less volatile organic compound byproducts.

DETAILED DESCRIPTION OF THE INVENTION

It has become increasingly understood that there is a need to reduce the environmental footprint of chemical processes. In typical art polyester polymerizations, excesses of the glycol are used and, in turn, must be recovered and repurified. For example, for poly(ethylene terephthalate), generally 40 to 100 percent excess ethylene glycol are used. For poly(1,4-butylene terephthalate) and poly(1,3-propylene terephthalate), the excess glycol utilized is typically in the range from about 20 to 60 percent. In addition, for polyester polymerizations which start from dimethyl terephthalate, as is typical for the preparation of polyesters which incorporate poly(alkylene ether)glycols, significant quantities of methanol must also be recovered and recycled. Such polymerization processes for polyesters which incorporate poly (alkylene ether)glycols are taught within the art in, for example, U.S. Pat. Nos. 3,023,192, 3,243,413, 3,558,557, 3,651,014, 3,701,755, 3,763,109, 3,766,146, 3,784,520, 3,880,976, 4,136,715, 4,262,114, 4,315,882, 4,467,595, 4,670,498, 4,906,729, 4,906,714.

As a means to reduce the amount of volatile organic compounds (VOC) evolved within the processes to produce polyesters which incorporate poly(alkylene ether)glycols, it has been generally taught within the art to start with preformed polyesters. Such general teachings may be found within, for example, U.S. Pat. Nos. 3,663,653, 3,775,374, 3,801,547, 4,156,774, 4,251,652, 4,315,882, 4,355,155 and 5,128,185, said references are hereby incorporated into the present invention through reference. These references do not exemplify said process and therefore are not enabling to one skilled within the art. The use of preformed low molecular weight polyesters in the production of polyesters which incorporate poly(alkylene ether) glycols was taught within U.S. Pat. Nos. 4,968,778 and 4,970,275.

The use of high molecular weight polyesters with intrinsic viscosities of 0.50 dL/g or greater in the production of polyesters which contain 1 to 60 parts by weight, preferably 5 to 35 parts by weight, of poly(alkylene ether)glycols was taught within U.S. Pat. No. 5,331,066, which is hereby incorporated into the present invention by reference. They however strongly teach away from the use of this process in the production of polyesters which incorporate greater than 60 weight percent poly(alkylene ether)glycols due to degradation of the thermal properties.

The present invention has surprisingly found a process to produce polyesters which incorporate between about 1 and 90 weight percent poly(alkylene ether)glycols which significantly reduces the level of volatile organic compound byproducts while maintaining thermal stabilities comparable to similar materials made within the art.

One aspect of the present invention is a process to produce polyesters which incorporate between about 1 to 90 weight percent poly(alkylene ether) glycols. Said process includes mixing and heating preformed polyesters with poly(alkylene ether) glycols and dicarboxylic acids or anhydrides, followed by standard finishing processes.

Said preformed polyester starting materials of the present invention are essentially comprised of 48 to 50 mole percent of one or more dicarboxylic acids, 48 to 50 mole percent of one or more diols and 0 to 2 mole percent polyfunctional branching agents.

Said dicarboxylic acid component is meant to include unsubstituted and substituted aromatic, aliphatic, unsaturated, and alicyclic dicarboxylic acids and the lower alkyl esters of dicarboxylic acids having from 2 carbons to 36 carbons. Specific examples of the desirable dicarboxylic acid component include terephthalic acid, dimethyl terephthalate, isophthalic acid, dimethyl isophthalate, 2,6-napthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), oxalic acid, dimethyl oxalate, malonic acid, dimethyl malonate, succinic acid, dimethyl succinate, methylsuccinc acid, glutaric acid, dimethyl glutarate, 2-methylglutaric acid, 3-methylglutaric acid, adipic acid, dimethyl adipate, 3-methyladipic acid, 2,2,5,5-tetramethylhexanedioic acid, pimelic acid, suberic acid, azelaic acid, dimethyl azelate, sebacic acid, 1,11-undecanedicarboxylic acid, 1,10-decanedicarboxylic acid, undecanedioic acid, 1,12-dodecanedicarboxylic acid, hexadecanedioic acid, docosanedioic acid, tetracosanedioic acid, dimer acid, 1,4-cyclohexanedicarboxylic acid, dimethyl-1,4-cyclohexanedicarboxylate, 1,3-cyclohexanedicarboxylic acid, dimethyl-1,3-cyclohexanedicarboxylate, 1,1-cyclohexanediacetic acid, metal salts of 5-sulfo-dimethylisophalate, fumaric acid, maleic anhydride, maleic acid, hexahydrophthalic acid phthalic acid and the like and mixtures derived therefrom. This should not be considered limiting. Essentially any dicarboxylic acid known within the art may find utility within the present invention.

Said diol component is meant to include unsubstituted, substituted, straight chain, branched, cyclic aliphatic, aliphatic-aromatic or aromatic diols having from 2 carbon atoms to 36 carbon atoms and poly(alkylene ether) glycols with molecular weights between about 250 to 4,000. Specific examples of the desirable other glycol component include ethylene glycol, 1,3-propanediol, 1,4-butanediol, 1,6-hexanediol, 1,8-octanediol, 1,10-decanediol, 1,12-dodecanediol, 1,14-tetradecanediol, 1,16-hexadecanediol, isosorbide, dimer diol, 4,8-bis(hydroxymethyl)-tricyclo [5.2.1.0/2.6]decane, 1,4-cyclohexanedimethanol, di(ethylene glycol), tri(ethylene glycol), poly(ethylene ether) glycols, poly(butylene ether) glycols and the like and mixtures derived therefrom. This should not be taken as limiting. Essentially any diol known within the art may find use within the present invention.

Said polyfunctional branching agent is meant to include any material with three or more carboxylic acid functions, hydroxy functions or a mixture thereof. The term "carboxylic acid functions" is meant to include carboxylic acids, lower alkyl esters of carboxylic acids, glycolate esters of carboxylic acids, and the like and mixtures thereof. Specific examples of the desirable polyfunctional branching agent component include 1,2,4-benzenetricarboxylic acid, (trimellitic acid), trimethyl-1,2,4-benzenetricarboxylate, tris (2-hyroxyethyl)-1,2,4-benzenetricarboxylate, trimethyl-1,2, 4-benzenetricarboxylate, 1,2,4-benzenetricarboxylic anhydride, (trimellitic anhydride), 1,3,5-benzenetricarboxylic acid, 1,2,4,5-benzenetetracarboxylic acid, (pyromellitic acid), 1,2,4,5-benzenetetracarboxylic dianhydride, (pyromellitic anhydride), 3,3',4,4'-benzophenonetetracarboxylic dianhydride, 1,4,5,8-naphthalenetetracarboxylic dianhydride, citric acid, tetrahydrofuran-2,3,4,5-tetracarboxylic acid, 1,3,5-cyclohexanetricarboxylic acid, pentaerythritol, 2-(hydroxymethyl)-1,3-propanediol, 2,2-bis (hydroxymethyl)propionic acid, trimer acid, and the like and mixtures therefrom. This should not be considered limiting. Essentially any polyfunctional material which includes three or more carboxylic acid or hydroxyl functions may find use within the present invention.

Preferably the preformed polyester starting material of the present invention is selected from the group comprised of poly(ethylene terephthalate), poly(1,3-propylene terephthalate), (poly(trimethylene terephthalate)), and poly (1,4-butylene terephthalate).

The preformed polyesters of the present invention need to have an inherent viscosity, which is an indicator of molecular weight, greater than about 0.40 dL/g. More desirably, the inherent viscosity (IV) of said preformed polyesters will be greater than about 0.50 dL/g, as measured on a 0.5 percent (weight/volume) solution of the polyester in a 50:50 (weight) solution of trifluoroacetic acid:dichloromethane solvent system at room temperature. These inherent viscosities will be sufficient for use within the process of the present invention.

The preformed polyester starting materials of the present invention may be prepared by conventional polycondensation techniques. The product compositions may vary somewhat based on the method of preparation used, particularly in the amount of diol that is present within the polymer. These methods include the reaction of the diol monomers with acid chlorides. For example, acid chlorides of the dicarboxylic acid component may be combined with the diol component in a solvent, such as toluene, in the presence of a base, such as pyridine, which neutralizes the hydrochloric acid as it is produced. Such procedures are known. See, for example, R. Storbeck, et al., in J. Appl. Polymer Science, Vol. 59, pp. 1199–1202 (1996). Other well known variations using acids chlorides may also be used, such as the interfacial polymerization method, or the monomers may simply be stirred together while heating.

When the polymer is made using acid chlorides, the ratio of the monomer units in the product polymer is about the same as the ratio of reacting monomers. Therefore, the ratio of monomers charged to the reactor is about the same as the desired ratio in the product. A stoichiometric equivalent of the diol components and the diacid components generally will be used to obtain a high molecular weight polymer.

Preferably, the preformed polyesters of the present invention will be produced through a melt polymerization method. In the melt polymerization method, the dicarboxylic acid component, (either as acids, esters, or mixtures thereof) the diol component and the polyfunctional branching agent, are combined in the presence of a catalyst to a high enough temperature that the monomers combine to form esters and diesters, then oligomers, and finally polymers. The polymeric product at the end of the polymerization process is a molten product. Generally, the diol component is volatile and distills from the reactor as the polymerization proceeds. Such procedures are known. See, for example, U.S. Pat. Nos. 3,563,942, 3,948,859, 4,094,721, 4,104,262, 4,166,895, 4,252,940, 4,390,687, 4,419,507, 4,585,687, 5,053,482, 5,292,783, 5,446,079, 5,480,962, and 6,063,464 and the references cited therein, which are herein incorporated by reference.

The melt process conditions of the present invention, particularly the amounts of monomers used, depend on the polymer composition that is desired. The amount of the diol component, dicarboxylic acid component, and branching agent are desirably chosen so that the final polymeric product contains the desired amounts of the various monomer units, desirably with equimolar amounts of monomer units derived from the respective diol and diacid components. Because of the volatility of some of the monomers, especially some of the diol components, and depending on such variables as whether the reactor is sealed, (i.e., is under pressure), the polymerization temperature ramp rate, and the efficiency of the distillation columns used in synthesizing the polymer, some of the monomers may need to be included in excess at the beginning of the polymerization reaction and removed by distillation as the reaction proceeds. This is particularly true of the diol component.

The exact amount of monomers to be charged to a particular reactor is readily determined by a skilled practitioner, but often will be in the ranges below. Excesses of the diacid and diol are often desirably charged, and the excess diacid and diol is desirably removed by distillation or other means of evaporation as the polymerization reaction proceeds. The diol component is desirably charged at a level 0 to 100 percent greater than the desired incorporation level in the final product. For examples of the diol component which are volatile under the polymerization conditions, such as ethylene glycol, 1,3-propanediol, or 1,4-butanediol, 30 to 100 percent excesses are desirably charged. For less volatile examples of the diol component, such as dimer diol, no excesses need be desirably charged.

The ranges given for the monomers are very wide because of the wide variation in the monomer loss during polymerization, depending on the efficiency of distillation columns and other kinds of recovery and recycle systems and the like, and are only an approximation. Exact amounts of monomers that are charged to a specific reactor to achieve a specific composition are readily determined by a skilled practitioner.

In the polymerization process, the monomers are combined, and are heated gradually with mixing with a catalyst or catalyst mixture to a temperature in the range of 230° C. to about 300° C., desirably 250° C. to 295 ° C. The exact conditions and the catalysts depend on whether the diacids are polymerized as true acids or as dimethyl esters. The catalyst may be included initially with the reactants, and/or may be added one or more times to the mixture as it is heated. The catalyst used may be modified as the reaction proceeds. The heating and stirring are continued for a sufficient time and to a sufficient temperature, generally with removal by distillation of excess reactants, to yield a molten polymer having a high enough molecular weight to be suitable for the present invention.

Catalysts that may be used include salts of Li, Ca, Mg, Mn, Zn, Pb, Sb, Sn, Ge, and Ti, such as acetate salts and oxides, including glycol adducts, and Ti alkoxides. These are generally known in the art, and the specific catalyst or combination or sequence of catalysts used may be readily selected by a skilled practitioner. The preferred catalyst and preferred conditions differ depending on, for example, whether the diacid monomer is polymerized as the free diacid or as a dimethyl ester and the exact chemical identity of the diol component.

Said poly(alkylene ether)glycols of the present invention may have a molecular weight in the range of about 500 to about 4000. Specific examples of poly(alkylene ether) glycols useful within the present invention include, for example, poly(ethylene glycol), poly(1,3-propylene glycol), poly(1,4-butylene glycol), (polytetrahydrofuran), poly (pentmethylene glycol), poly(hexamethylene glycol), poly (hepthamethylene glycol), poly(ethylene glycol)-block-poly (propylene glycol)-block-poly(ethylene glycol), 4,4'-isopropylidenediphenol ethoxylate (Bisphenol A ethoxylate), 4,4'-(1-phenylethylidene)bisphenol ethoxylate (Bisphenol AP ethoxylate), 4,4'-ethylidenebisphenol ethoxylate (Bisphenol E ethoxylate), bis(4-hydroxyphenyl) methane ethoxylate (Bisphenol F ethoxylate), 4,4'-(1,3- phenylenediisopropylidene)bisphenol ethoxylate (Bisphenol M ethoxylate), 4,4'-(1,4-phenylenediisopropylidene)bisphenol ethoxylate (Bisphenol P ethoxylate), 4,4'-sulfonyidiphenol ethoxylate (Bisphenol S ethoxylate), 4,4'-cyclohexylidenebisphenol ethoxylate (Bisphenol Z ethoxylate),
and the like and mixtures thereof. This should not be considered limiting. Essentially any poly(alkylene ether) glycols known within the art may find use in the process of the present invention.

The amount of poly(alkylene ether)glycol to be added in the process of the present invention may be in the amount necessary to produce polyesters which incorporate 1 to 90 weight percent poly(alkylene ether)glycol. Preferably, the amount of poly(alkylene ether)glycol to be added in the process of the present invention may be in the amount necessary to produce polyesters which incorporate 5 to 85 weight percent poly(alkylene ether)glycol. More preferably, the amount of poly(alkylene ether)glycol to be added in the process of the present invention may be in the amount necessary to produce polyesters which incorporate 8 to 80 weight percent poly(alkylene ether)glycol.

Said dicarboxylic acid or anhydride component is meant to include unsubstituted and substituted aromatic, aliphatic, unsaturated, and alicyclic dicarboxylic acids having from 2 carbons to 36 carbons and unsubstituted and substituted aromatic, aliphatic, unsaturated, and alicyclic dicarboxylic anhydrides having from 2 carbons to 36 carbons. Specific examples of the desirable dicarboxylic acid or anhydride component include terephthalic acid, isophthalic acid, 2,6-napthalene dicarboxylic acid, 2,7-naphthalenedicarboxylic acid, 3,4'-diphenyl ether dicarboxylic acid, 4,4'-diphenyl ether dicarboxylic acid, 3,4'-diphenyl sulfide dicarboxylic acid, 4,4'-diphenyl sulfide dicarboxylic acid, 3,4'-diphenyl sulfone dicarboxylic acid, 4,4'-diphenyl sulfone dicarboxylic acid, 3,4'-benzophenonedicarboxylic acid, dimethyl-3,4'-benzophenonedicarboxylate, 4,4'-benzophenonedicarboxylic acid, 1,4-naphthalene dicarboxylic acid, 4,4'-methylene bis(benzoic acid), oxalic acid, malonic acid, succinic acid, methylsuccinc acid, glutaric acid, 2-methylglutaric acid, 3-methylglutaric acid, adipic acid, 3-methyladipic acid, 2,2,5,5-tetramethylhexanedioic acid, pimelic acid, suberic acid, azelaic acid, sebacic acid, 1,11-undecanedicarboxylic acid, 1,10-decanedicarboxylic acid, undecanedioic acid, 1,12-dodecanedicarboxylic acid, hexadecanedioic acid, docosanedioic acid, tetracosanedioic acid, dimer acid, 1,4-cyclohexanedicarboxylic acid, 1,3-cyclohexanedicarboxylic acid, 1,1-cyclohexanediacetic acid, metal salts of 5-sulfo-isophthalic acid, fumaric acid, maleic anhydride, maleic acid, hexahydrophthalic acid, phthalic acid, succinic anhydride, phthalic anhydride, hexahydrophthalic anhydride, 1,8-naphthalic anhydride, 2,3-napthalic anhydride and the like and mixtures derived therefrom. This should not be considered limiting. Essentially any dicarboxylic acid and anhydride known within the art may find utility within the present invention.

The dicarboxylic acid or anhydride component should be added at a level between 0.10 to 2.0 molar stoichiometric equivalents of the poly(alkylene ether)glycol component. Preferably, the dicarboxylic acid or anhydride component should be added at a level between 0.10 to 1.25 molar stoichiometric equivalents of the poly(alkylene ether)glycol component. More preferably, the dicarboxylic acid or anhydride component should be added at essentially molar stoichiometric equivalence of the poly(alkylene ether)glycol component.

The process of the present invention includes mixing together the preformed polyester, the poly(alkylene ether) glycol, and the dicarboxylic acid or anhydride at a sufficient temperature and for a sufficient time to form the polyesters which incorporate poly(alkylene ether)glycols of the present invention followed by a second finishing process to enhance the molecular weight of the polyester of the present invention.

The temperature utilized within the process of the present invention should be sufficient to melt the preformed polyester and to allow for a significant reaction rate between the preformed polyester, the poly(alkylene ether)glycol, and the dicarboxylic acid or anhydride. Generally, the process temperature of the present invention will be within the range of 150° C. to 350° C. Preferably, this process temperature range is between about 220° C. and 300° C.

The time required for the process of the present invention will be a complicated function of the exact chemical identity of the preformed polyester, the exact chemical identity of the poly(alkylene ether)glycol, the exact chemical identity of the dicarboxylic acid or anhydride, the process temperature, the process equipment utilized, the mixing intensity, and the like. An effective amount of time is required by the process of the present invention to provide the products of the present invention. The time for the process of the present invention may be in the range from 0 to about 5 hours. Generally, the process of the present invention will have a time greater than one minute. Preferably, the process time will be greater than 5 minutes. More preferably, the process time will be greater than 20 minutes.

Optionally, added catalysts may be used within the process of the present invention. It has generally been found that the process of the present invention may be performed relying on the residual catalysts incorporated within the preformed polyester. However, it is contemplated that the use of additional catalysts will increase the rate of the process, if that is desired. Additional catalysts that may be used include salts of Li, Ca, Mg, Mn, Zn, Pb, Sb, Sn, Ge, and Ti, such as acetate salts and oxides, including glycol adducts, and Ti alkoxides. These are generally known in the art, and the specific catalyst or combination or sequence of catalysts used may be readily selected by a skilled practitioner.

The process may be performed in any known equipment in the art. For example, the preformed polyester, the poly (alkylene ether)glycols, the dicarboxylic acid or anhydride, and optionally, additional catalysts, may be added to a stirred autoclave and heated to melt said preformed polyester, poly(alkylene ether)glycol, and dicarboxylic acid or anhydride, and mixed at temperature for a sufficient time to effect the process. However, it is further contemplated that the preformed polyester, the poly(alkylene ether)glycol, the dicarboxylic acid or anhydride, and optionally, additional catalysts, may be fed to a single- or twin-screw extruder, melted and mixed and, in turn, fed to a transfer line to allow for sufficient time to effect the process of the present invention. Said transfer line may include additional mixing, as through static mixers. Alternatively, the molten mixture exiting the extruder may be fed to a continuous polymerizer (CP) multi-vessel train. Each vessel would constitute a continuous stirred reactor (CSR). This should not be considered limiting. Essentially any equipment known within the art which allows for process of the present invention will find utility within the present invention.

Preferentially, the process of the present invention includes finishing the as produced product to achieve the desired product molecular weight. This may be performed by sparging the molten product with inert gases, such as nitrogen, or by applying vacuum. Heating under the inert gas sparging or vacuum may be continued until the molten polymer reaches the desired molecular weight, usually recognized by an increase in the melt viscosity to a predetermined level. This is observed as an increase in the torque needed for the stirring motor to maintain stirring. An inherent viscosity of at least 0.5 dL/g, and generally up to about 0.65 dL/g or greater can be achieved by this melt finishing process without further efforts at raising molecular weight.

Optionally, solid state polymerization may be used to achieve the higher inherent viscosities (molecular weights).

The product made by the process of the present invention, after extruding, cooling and pelletizing, may be essentially noncrystalline. Noncrystalline material can be made semicrystalline by heating it to a temperature above the glass transition temperature for an extended period of time. This induces crystallization so that the product can then be heated to a higher temperature to raise the molecular weight.

The polymer may also be crystallized prior to solid state polymerization by treatment with a relatively poor solvent for polyesters which induces crystallization. Such solvents reduce the glass transition temperature (Tg) allowing for crystallization. Solvent induced crystallization is known for polyesters and is described in U.S. Pat. Nos. 5,164,478 and 3,684,766, which are incorporated herein by reference.

The semicrystalline polymer is subjected to solid state polymerization by placing the pelletized or pulverized polymer into a stream of an inert gas, usually nitrogen, or under a vacuum of 1 Torr, at an elevated temperature, but below the melting temperature of the polymer for an extended period of time.

The polyesters which incorporate poly(alkylene ether) glycols produced by the process of the present invention may incorporate additives, fillers, or other materials commonly taught within the art. Said additives may include thermal stabilizers, antioxidants, UV absorbers, UV stabilizers, processing aides, waxes, lubricants, color stabilizers, and the like. Said fillers may include calcium carbonate, glass, kaolin, talc, clay, carbon black, and the like. Said other materials may include nucleants, pigments, dyes, delusterants, such as titanium dioxide and zinc sulfide, antiblocks, such as silica, antistats, flame retardants, brighteners, silicon nitride, metal ion sequestrants, anti-staining agents, silicone oil, surfactants, soil repellants, modifiers, viscosity modifiers, zirconium acid, reinforcing fibers, and the like. These additives, fillers, and other materials may be incorporated within the polyesters which incorporate poly(alkylene ether)glycol of the present invention through a separate melt compounding process utilizing any known intensive mixing process, such as extrusion, through intimate mixing with the solid granular material, such as pellet blending, or through cofeeding within the process of the present invention. Alternatively, the additives, fillers, and other materials may be incorporated into the preformed polyester starting material prior to the process of the present invention. If said additives, fillers, and other materials are incorporated prior to or during the process of the present invention, it is important to ensure that they do not interfere with the process of the present invention.

The polyesters which incorporate poly(alkylene ether) glycols produced by the process of the present invention may be blended with other polymers commonly taught within the art. Said other polymers may include polyolefins, such as polyethylene, polypropylene, polybutene, poly-4-methyl pentene, polystyrene, and the like, cyclic olefin polymers, modified polyolefins, such as copolymers of various alpha-olefins, glycidyl esters of unsaturated acids, ionomers, ethylene/vinyl copolymers such as ethylene/vinyl chloride copolymers, ethylene/vinyl acetate copolymers, ethylene/acrylic acid copolymers, ethylene/methacrylic acid copolymers and the like, thermoplastic polyurethanes, polyvinyl chloride, polyvinlidene chloride copolymers, liquid crystalline polymers, fluorinated polymers, such as polytetrafluoroethylene, ethylene tetrafluoroethylene copolymers, tetrafluoroethylene hexafluoropropylene copolymers, polyfluoroalkoxy copolymers, polyvinylidene fluoride, polyvinylidene copolymers, ethylene chlorotrifluoroethylene copolymers, and the like, polyamides, such as Nylon-6, Nylon-66, Nylon 69, Nylon 610, Nylon 611, Nylon 612, Nylon 11, Nylon 12, and copolymers and the like, polyimides, polyphenylene sulfide, polyphenylene oxide, polysulfones, polyethersulfones, rubbers, polycarbonate, polyacrylates, terpene resins, polyacetal, styrene/acrylonitrile copolymers, styrene/maleic anhydride copolymers, styrene/maleimide copolymers, coumarone/indene copolymers, and the like and combinations thereof.

These other polymers may be incorporated within the polyesters which incorporate poly(alkylene ether) glycols of the present invention through a separate melt compounding process utilizing any known intensive mixing process, such as extrusion through a single or twin screw extruder, through intimate mixing with the solid granular material, such as mixing, stirring or pellet blending operations, or through cofeeding within the process. Alternatively, the other polymers may be incorporated into the preformed polyester starting material prior to the process of the present invention. If said other polymers are incorporated prior to or during the process of the present invention, it is important to ensure that they do not interfere with the process of the present invention.

The polyesters which incorporate poly(alkylene ether) glycols produced within the process of the present invention will find utility as elastomers for fibers or molded parts.

EXAMPLES AND COMPARATIVE EXAMPLES

Test Methods

Differential Scanning Calorimetry (DSC) was performed on a TA Instruments Model Number 2920 machine. Samples were heated under a nitrogen atmosphere at a rate of 20° C./minute to 300° C., programmed cooled back to room temperature at a rate of 20° C./minute and then reheated to 300° C. at a rate of 20° C./minute. The observed sample glass transition temperature (Tg) and crystalline melting temperature (Tm) noted below were from the second heat.

Thermal Gravimetric Analysis (TGA) was performed in both an air and a nitrogen environment from room temperature to 500° C. at a temperature ramp rate of 10° C. per minute. The temperature to 1, 5, 10, 25, and 50 weight percent loss was noted.

Inherent Viscosity (IV) is defined in "Preparative Methods of Polymer Chemistry", W. R. Sorenson and T. W. Campbell, 1961, p. 35. It is determined at a concentration of 0.5 g./100 mL of a 50:50 weight percent trifluoroacetic acid:dichloromethane acid solvent system at room temperature by a Goodyear R-103B method.

Laboratory Relative Viscosity (LRV) is the ratio of the viscosity of a solution of 0.6 gram of the polyester sample dissolved in 10 mL of hexafluoroisopropanol (HFIP) containing 80 ppm sulfuric acid to the viscosity of the sulfuric acid-containing hexafluoroisopropanol itself, both measured at 25° C. in a capillary viscometer. The LRV may be numerically related to IV. Where this relationship is utilized, the term "calculated IV" is noted.

Gas Chromatography (GC) analysis was performed on a Hewlett Packard 5890 Series II Plus for the methanol analysis. Gas chromatography analysis was performed on a Hewlett 5890 Series II for the ethylene glycol analysis. Water analysis was performed on a Mitsubishi CA-06 Moisture Meter.

Comparative Example CE1

To a glass reactor was charged dimethyl terephthalate, (101.14 grams), ethylene glycol, (51.73 grams), poly(ethylene glycol), (300.00 grams, average molecular weight=1,500), manganese(II) acetate tetrahydrate, (0.178 grams), and antimony(III) oxide, (0.144 grams). The resulting reaction mixture was heated to 180° C. with stirring under a slight nitrogen purge. The resulting reaction mixture was then heated to 190° C. over 0.66 hours. After stirring at 190° C. for 0.42 hours, the resulting reaction mixture was heated to 200° C. over 0.25 hours. After stirring at 200° C. under a slight nitrogen purge for 0.33 hours, the resulting reaction mixture was heated to 215° C. over 0.83 hours. After stirring at 215° C. for 1 hour, the resulting reaction mixture was heated to 285° C. over 2 hours. After stirring at 285° C. for 0.50 hours under a slight nitrogen purge a total of 27.25 grams of distillates had been collected. Vacuum was then staged on. The resulting reaction mixture was allowed to stir under full vacuum, (pressure<100 millitorr), at 285° C. for 3.0 hours. The vacuum was then released with nitrogen and the resulting reaction mixture allowed to cool to room temperature. An additional 31.41 grams of distillates were collected while the reaction mixture was under vacuum. 371.04 grams of product were recovered.

The Laboratory Relative Viscosity (LRV) for the polymer prepared above was measured to be 32.16. The calculated Inherent Viscosity (IV) equivalent was determined to be 0.83 dL/g.

Differential scanning calorimetry (DSC) was performed on the polymer prepared above. During the first heating cycle, a crystalline melting point, Tm, was observed at 39.9° C., (40.4 J/g). No transitions were observed within the programmed cool cycle. During the second heating cycle, a crystalline melting point, Tm, was observed at 35.3° C., (49.5 J/g).

Thermal gravimetric analysis (TGA) was performed in a nitrogen environment and demonstrated a 1 weight percent loss at a temperature of 342° C., a 5 weight percent loss at a temperature of 376° C., a 10 weight percent loss at a temperature of 386° C., a 25 weight percent loss at a temperature of 399° C., and a 50 weight percent loss at a temperature of 412 ° C. Thermal gravimetric analysis (TGA) was performed in an air environment and demonstrated a 1 weight percent loss at a temperature of 210° C., a 5 weight percent loss at a temperature of 237° C., a 10 weight percent loss at a temperature of 252° C., a 25 weight percent loss at a temperature of 280° C., and a 50 weight percent loss at a temperature of 312 ° C.

The distillates were analyzed by Gas Chromatography (GC) and Moisture analysis. The total distillates, (58.66 grams), was determined to contain 41.83 weight percent methanol, (24.54 grams), 47.99 weight percent ethylene glycol, (28.15 grams), and 1.04 weight percent water, (0.61 grams). The distillates contain 89.82 weight percent Volatile Organic Compounds, (52.69 grams), when the methanol and ethylene glycol components are added together.

Comparative Example CE2

To a glass reactor was charged poly(ethylene terephthalate), (100.00 grams, Inherent Viscosity (IV) of 0.62 dL/g), and poly(ethylene glycol), (300.00 grams, average molecular weight=1,500). The resulting reaction mixture was heated to 180° C. with stirring under a slight nitrogen purge. The resulting stirred reaction mixture was then heated to 285° C. over 1 hour under a slight nitrogen purge. After the reaction mixture had stirred at 285 ° C. for 3 hours, a total of 1.35 grams of distillates had been collected. Vacuum was then staged on. The resulting reaction mixture was allowed to stir at 285° C. under full vacuum, (pressure<100 millitorr), for 3.0 hours. The vacuum was then released with nitrogen and the resulting reaction mixture allowed to cool to room temperature. An additional 6.95 grams of distillates were collected while the reaction mixture was under vacuum. 379 grams of product were recovered.

The Laboratory Relative Viscosity (LRV) for the polymer prepared above was measured to be 18.47. The calculated Inherent Viscosity (IV) equivalent was determined to be 0.58 dL/g.

Differential scanning calorimetry (DSC) was performed on the polymer prepared above. During the first heating cycle, a crystalline melting point, Tm, was observed at 40.9° C., (23.0 J/g). No transitions were observed within the programmed cool cycle. During the second heating cycle, a crystalline melting point, Tm, was observed at 34.1° C.

Thermal gravimetric analysis (TGA) was performed in a nitrogen environment and demonstrated a 1 weight percent loss at a temperature of 340° C., a 5 weight percent loss at a temperature of 374° C., a 10 weight percent loss at a temperature of 384° C., a 25 weight percent loss at a temperature of 397° C., and a 50 weight percent loss at a temperature of 410 ° C. Thermal gravimetric analysis (TGA) was performed in an air environment and demonstrated a 1 weight percent loss at a temperature of 201° C., a 5 weight percent loss at a temperature of 236° C., a 10 weight percent loss at a temperature of 258° C., a 25 weight percent loss at a temperature of 302° C., and a 50 weight percent loss at a temperature of 345 ° C.

The distillates were analyzed by Gas Chromatography (GC) and Moisture analysis. The total distillates, (8.30 grams), was determined to contain 0.10 weight percent methanol, (0.008 grams), 85.76 weight percent ethylene glycol, (7.12 grams), and 8.21 weight percent water, (0.68 grams). The distillates contain 85.86 weight percent Volatile Organic Compounds, (7.13 grams), when the methanol and ethylene glycol components are added together.

Comparative Example CE3

To a glass reactor was charged poly(ethylene terephthalate), (100.00 grams, Inherent Viscosity (IV) of 0.62 dL/g), poly(ethylene glycol), (300.00 grams, average molecular weight=1,500), and antimony(III) oxide, (0.144 grams). The resulting reaction mixture was heated to 180° C. with stirring under a slight nitrogen purge. The resulting stirred reaction mixture was then heated to 285° C. over 1.7 hours under a slight nitrogen purge. After the reaction mixture had stirred at 285° C. for 1.6 hours, a total of 0.91 grams of distillates had been collected, Vacuum was then staged on. The resulting reaction mixture was allowed to stir at 285° C. under full vacuum, (pressure<100 millitorr), for 3.0 hours. The vacuum was then released with nitrogen and the resulting reaction mixture allowed to cool to room temperature. An additional 9.35 grams of distillates were collected while the reaction mixture was under vacuum. 379.7 grams of product were recovered.

The Laboratory Relative Viscosity (LRV) for the polymer prepared above was measured to be 34.74. The calculated Inherent Viscosity (IV) equivalent was determined to be 0.87 dL/g.

Differential scanning calorimetry (DSC) was performed on the polymer prepared above. During the first heating cycle, a crystalline melting point, Tm, was observed at 40.6° C., (24.8 J/g). No transitions were observed within the programmed cool cycle. During the second heating cycle, a crystalline melting point, Tm, was observed at 31.9° C., (5.9 J/g).

Thermal gravimetric analysis (TGA) was performed in a nitrogen environment and demonstrated a 1 weight percent loss at a temperature of 338° C., a 5 weight percent loss at a temperature of 376° C., a 10 weight percent loss at a temperature of 386° C., a 25 weight percent loss at a temperature of 400° C., and a 50 weight percent loss at a temperature of 413 ° C. Thermal gravimetric analysis (TGA) was performed in an air environment and demonstrated a 1 weight percent loss at a temperature of 209° C., a 5 weight percent loss at a temperature of 243° C., a 10 weight percent loss at a temperature of 258° C., a 25 weight percent loss at a temperature of 285° C., and a 50 weight percent loss at a temperature of 332 ° C.

The distillates were analyzed by Gas Chromatography (GC) and Moisture analysis. The total distillates, (10.26 grams), was determined to contain 0.21 weight percent methanol, (0.02 grams), 84.33 weight percent ethylene glycol, (8.65 grams), and 12.91 weight percent water, (1.33 grams). The distillates contain 84.54 weight percent Volatile Organic Compounds, (8.67 grams), when the methanol and ethylene glycol components are added together.

Example 1

To a glass reactor was charged poly(ethylene terephthalate), (61.59 grams, Inherent Viscosity (IV) of 0.62 dL/g), poly(ethylene glycol), (300.00 grams, average molecular weight=1,500), and terephthalic acid, (33.23 grams). The resulting stirred reaction mixture was heated to 180° C. under a slight nitrogen purge. The resulting stirred reaction mixture was then heated to 285° C. over 2 hours under a slight nitrogen purge. After stirring at 285° C. for 1 hour under a slight nitrogen purge, a total of 3.00 grams of distillates were recovered. Vacuum was then staged on. The resulting reaction mixture was stirred at 285° C. under full vacuum, (pressure<100 millitorr), for 1.7 hours. The vacuum was then released with nitrogen and the reaction mixture was allowed to cool to room temperature. An additional 3.09 grams of distillates were collected while the reaction mixture was under vacuum. 354 grams of product were recovered.

The Laboratory Relative Viscosity (LRV) for the polymer prepared above was measured to be 11.15. The calculated Inherent Viscosity (IV) equivalent was determined to be 0.45 dL/g.

Differential scanning calorimetry (DSC) was performed on the polymer prepared above. During the first heating cycle, a crystalline melting point, Tm, was observed at 44.7° C., (38.9 J/g). No thermal transitions were observed during the programmed cool down cycle. During the second heating cycle, a crystalline melting point, Tm, was observed at 34.7° C., (38.4 J/g).

Thermal gravimetric analysis (TGA) was performed in a nitrogen environment and demonstrated a 1 weight percent loss at a temperature of 328° C., a 5 weight percent loss at a temperature of 371° C., a 10 weight percent loss at a temperature of 382° C., a 25 weight percent loss at a temperature of 397° C., and a 50 weight percent loss at a temperature of 410 ° C. Thermal gravimetric analysis (TGA) was performed in an air environment and demonstrated a 1 weight percent loss at a temperature of 207° C., a 5 weight percent loss at a temperature of 243° C., a 10 weight percent loss at a temperature of 262° C., a 25 weight percent loss at a temperature of 297° C., and a 50 weight percent loss at a temperature of 340 ° C.

The distillates were analyzed by Gas Chromatography (GC) and Moisture analysis. The total distillates, (6.09 grams), was determined to contain 0.15 weight percent methanol, (0.01 grams), 11.28 weight percent ethylene glycol, (0.69 grams), and 72.46 weight percent water, (4.41 grams). The distillates contain 11.43 weight percent Volatile Organic Compounds, (0.70 grams), when the methanol and ethylene glycol components are added together.

The process of the present invention, as represented by Example 1, was found to evolve to evolve 75.3 times less Volatile Organic Compounds than found in the background art, as represented by Comparative Example CE1, 10.2 times less Volatile Organic Compounds than found in the background art, as represented by Comparative Example CE2, and 12.4 times less Volatile Organic Compounds when compared in the background art, as represented by Comparative Example CE3.

Example 2

To a glass reactor was charged poly(ethylene terephthalate), (61.59 grams, Inherent Viscosity (IV) of 0.62 dL/g), poly(ethylene glycol), (300.00 grams, average molecular weight=1,500), terephthalic acid, (33.23 grams) and antimony(III) oxide, (0.144 grams). The resulting stirred reaction mixture was heated to 180° C. under a slight nitrogen purge. The resulting stirred reaction mixture was then heated to 285° C. over 1.5 hours under a slight nitrogen purge. After stirring at 285° C. for 1.3 hours, a total of 4.67 grams of distillates had been collected. Vacuum was then staged on. The resulting reaction mixture was stirred at 285° C. under full vacuum, (pressure<100 millitorr), for 3.2 hours. The vacuum was then released with nitrogen and the reaction mixture was allowed to cool to room temperature. An additional 2.60 grams of distillates were collected while the reaction mixture was under vacuum. 373 grams of product were recovered.

The Laboratory Relative Viscosity (LRV) for the polymer prepared above was measured to be 17.19. The calculated Inherent Viscosity (IV) equivalent was determined to be 0.56 dL/g.

Differential scanning calorimetry (DSC) was performed on the polymer prepared above. During the first heating cycle, a crystalline melting point, Tm, was observed at 38.9° C., (44.4 J/g). No thermal transitions were observed during the programmed cool down cycle. During the second heating cycle, a crystalline melting point, Tm, was observed at 34.2° C., (38.6 J/g).

Thermal gravimetric analysis (TGA) was performed in a nitrogen environment and demonstrated a 1 weight percent loss at a temperature of 316° C., a 5 weight percent loss at a temperature of 369° C., a 10 weight percent loss at a temperature of 381° C., a 25 weight percent loss at a temperature of 396° C., and a 50 weight percent loss at a temperature of 409 ° C. Thermal gravimetric analysis (TGA) was performed in an air environment and demonstrated a 1 weight percent loss at a temperature of 197° C., a 5 weight percent loss at a temperature of 228° C., a 10 weight percent loss at a temperature of 245° C., a 25 weight percent loss at a temperature of 281° C., and a 50 weight percent loss at a temperature of 327 ° C.

The distillates were analyzed by Gas Chromatography (GC) and Moisture analysis. The total distillates, (7.27 grams), was determined to contain 0.10 weight percent methanol, (0.007 grams), 18.50 weight percent ethylene glycol, (1.34 grams), and 70.89 weight percent water, (5.15 grams). The distillates contain 18.61 weight percent Volatile Organic Compounds, (1.35 grams), when the methanol and ethylene glycol components are added together.

The process of the present invention, as represented by Example 2, was found to evolve to evolve 39.0 times less Volatile Organic Compounds than found in the background art, as represented by Comparative Example CE1, 5.3 times less Volatile Organic Compounds than found in the background art, as represented by Comparative Example CE2, and 6.4 times less Volatile Organic Compounds when compared in the background art, as represented by Comparative Example CE3.

Example 3

To a glass reactor was charged poly(tetramethylene glycol), (average molecular weight=2000), (150.0 grams), isophthalic acid, (5.0 grams), titanium(IV) isopropoxide, (0.045 grams), and poly(trimethylene terephthalate), (150.0 grams, Laboratory Relative Viscosity (LRV) of 49.42; calculated Inherent Viscosity (IV) equivalent was determined to be 1.14 dL/g). Vacuum was staged on. The resulting reaction mixture was heated to 180° C. over 0.25 hours under full vacuum, (pressure<100 millitorr). The reaction mixture was heated to 255° C. over 1.25 hours with stirring and under full vacuum. The resulting reaction mixture was stirred at 255° C. for 3.8 hours under full vacuum. The vacuum was then released with nitrogen and the reaction mixture allowed to cool to room temperature. A total of 1.4 grams of distillates were collected throughout the course of the process.

The Inherent Viscosity (IV) for the polymer prepared above was measured to be 1.2 dL/g.

Differential scanning calorimetry (DSC) was performed on the polymer prepared above. During the first heating cycle, a crystalline melting point, Tm, was observed at 218.3° C., (12.8 J/g). During the programmed cool cycle a crystallization temperature was observed with an onset temperature of 173.4° C., and a peak crystallization temperature of 164.5° C., (18.0 J/g). During the second heating cycle, a crystalline melting point, Tm, was observed at 217.3° C., (17.3 J/g).

Example 4

To a glass reactor was charged poly(ethylene glycol)-blockpoly(propylene glycol)-block-poly(ethylene glycol), (average molecular weight=2000, 10 weight percent ethylene glycol content), (15.00 grams), isophthalic acid, (1.25 grams), titanium(IV) and poly(1,4-butylene terephthalate), (135.0 grams, Laboratory Relative Viscosity (LRV) of 58.5; calculated Inherent Viscosity (IV) equivalent was determined to be 1.3 dL/g). The resulting reaction mixture was heated to 255° C. over 4 hours under a slight nitrogen purge with stirring. The reaction mixture was stirred at 255 ° C.; for 1.25 hours under a slight nitrogen purge. Vacuum was then staged on. The resulting reaction mixture was stirred at 255° C. for 3.17 hours under full vacuum, (pressure<100 millitorr). The vacuum was then released with nitrogen and the reaction mixture allowed to cool to room temperature. A total of 0.30 grams of distillates were collected throughout the course of the process.

The Laboratory Relative Viscosity (LRV) for the polymer prepared above was measured to be 32.99. The calculated Inherent Viscosity (IV) equivalent was determined to be 0.84 dL/g.

Differential scanning calorimetry (DSC) was performed on the polymer prepared above. During the first heating cycle, a crystalline melting point, Tm, was observed at 225.3° C., (44.4 J/g). During the programmed cool cycle a crystallization temperature was observed with an onset temperature of 192.8° C., and a peak crystallization temperature of 187.4° C., (47.5 J/g). During the second heating cycle, a crystalline melting point, Tm, was observed at 222.6° C., (41.4 J/g).

Example 5

To a glass reactor was charged poly(tetramethylene glycol), (average molecular weight=2000), (37.50 grams), succinic anhydride, (1.88 grams), titanium(IV) isopropoxide, (0.10 grams), and poly(1,4-butylene terephthalate), (112.50 grams, Laboratory Relative Viscosity (LRV) of 58.5; calculated Inherent Viscosity (IV) equivalent was determined to be 1.3 dL/g). The resulting reaction mixture was heated to 255° C. over 1.25 hours under a slight nitrogen purge with stirring. The reaction mixture was heated at 255 ° C. for 1.25 hours with stirring and under a slight nitrogen purge. Vacuum was then stage on. The resulting reaction mixture was stirred at 255° C. for 2.5 hours under full vacuum, (pressure<100 millitorr). The vacuum was then released with nitrogen and the reaction mixture allowed to cool to room temperature. A total of 0.3 grams of distillates were collected throughout the course of the process.

The Laboratory Relative Viscosity (LRV) for the polymer prepared above was measured to be 43.78. The calculated Inherent Viscosity (IV) equivalent was determined to be 1.04 dL/g.

Differential scanning calorimetry (DSC) was performed on the polymer prepared above. During the first heating cycle, a crystalline melting point, Tm, was observed at 224.6° C., (29.9 J/g). During the programmed cool cycle a crystallization temperature was observed with an onset temperature of 192.0° C., and a peak crystallization temperature of 187.3° C., (32.1 J/g). During the second heating cycle, a crystalline melting point, Tm, was observed at 223.1° C., (25.4 J/g).

It is to be understood that the above described embodiments are illustrative only and that modification throughout may occur to one skilled in the art. Accordingly, this invention is not to be regarded as limited to the embodiments disclosed herein.

What is claimed is:

1. A process for producing a polyester that comprises 1 to 90 wt. % poly(alkylene ether) glycol comprising copolymerizing (i) a performed polyester polymer having an inherent viscosity of at least 0.4 dL/g, (ii) a poly(alkylene ether) glycol, and (iii) a dicarboxylic acid or anhydride, to obtain said polyester comprising said 1 to 90 wt. % poly(alkylene ether glycol), said process producing distillates comprising 50 weight percent volatile organic compounds or less, based on the total weight of the distillates.

2. The process of claim 1 wherein said polyester comprises 5 to 85 wt. % poly(alkylene ether) glycol.

3. The process of claim 1 wherein said polyester comprises 8 to 80 wt. % poly(alkylene ether) glycol.

4. The process of claim 1 wherein said copolymerizing comprises conducting polycondensation after or while mixing and heating (i) said preformed polyester polymer, (ii) said poly(alkylene ether) glycol, and (iii) said dicarboxylic acid or anhydride.

5. The process of claim 1 wherein said preformed polyester polymer has an inherent viscosity greater than 0.5 dL/g.

6. The process of claim 1 wherein said preformed polyester polymer comprises poly(ethylene terephthalate), poly(1,3-propylene terephthalate), poly(1,3-trimethylene terephthalate), or poly(1,4-butylene terephthalate).

7. The process of claim 1 wherein said preformed polyester polymer is formed by a polycondensation.

8. The process of claim 1 wherein said preformed polyester polymer is formed by the steps comprising combining a dicarboxylic acid component, a diol component, and a polyfunctional branching agent component in the presence of a catalyst at a temperature sufficient to form said preformed polyester polymer.

9. The process of claim 8 wherein said combining includes 48 to 50 mole % of said dicarboxylic acid component, 48 to 50 mole % of said diol component, and 0 to 2 mole % of said polyfunctional branching agent component.

10. The process of claim 8 wherein said dicarboxylic acid component comprises an unsubstituted or substituted aromatic, aliphatic, unsaturated, or alicyclic dicarboxylic acid or a lower alkyl ester of a dicarboxylic acid having from 2 carbon atoms to 36 carbon atoms.

11. The process of claim 8 wherein said diol component comprises an unsubstituted, substituted, straight chain, branched, cyclic aliphatic, aliphatic-aromatic, or aromatic diol having from 2 carbon atoms to 36 carbon atoms, or a poly(alkylene ether) glycol having a molecular weight of 250 to 4,000.

12. The process of claim 8 wherein said polyfunctional branching agent comprises three or more carboxylic acid functions, hydroxy functions, or a mixture thereof.

13. The process of claim 1 wherein said preformed polyester polymer comprises a blend of at least two polymers.

14. The process of claim 1 wherein said poly(alkylene ether) glycol has a molecular weight of 500 to 4,000.

15. The process of claim 1 wherein said dicarboxylic acid comprises an unsubstituted or substituted aromatic, aliphatic, unsaturated, or alicyclic dicarboxylic acid having from 2 carbon atoms to 36 carbon atoms, and wherein said anhydride comprises an unsubstituted or substituted aromatic, aliphatic, unsaturated, or alicyclic dicarboxylic anhydride having from 2 carbon atoms to 36 carbon atoms.

16. The process of claim 1 wherein said dicarboxylic acid or anhydride has a concentration of 0.1 to 2 molar stoichiometric equivalents of said poly(alkylene ether) glycol.

17. The process of claim 16 wherein said concentration is 0.1 to 1.25 molar stoichiometric equivalents.

18. The process of claim 1 wherein said polymerizing comprises:
 a first polymerization to form a polyester comprising 1 to 90 wt. % poly(alkylene ether) glycol having an inherent viscosity less than 0.5 dL/g; and
 a second finishing process to form said polyester comprising 1 to 90 wt. % poly(alkylene ether) glycol having said inherent viscosity of at least 0.5 dL/g.

19. The process of claim 18 wherein said second finishing process is a melt finishing process.

20. The process of claim 18 wherein said second finishing process is a solid state polymerization.

* * * * *

UNITED STATES PATENT AND TRADEMARK OFFICE
CERTIFICATE OF CORRECTION

PATENT NO. : 6,610,795 B2  Page 1 of 1
DATED : August 26, 2003
INVENTOR(S) : Hayes, Richard A.

It is certified that error appears in the above-identified patent and that said Letters Patent is hereby corrected as shown below:

<u>Column 16,</u>
Line 49, delete "performed", add -- preformed --.

Signed and Sealed this

Twenty-third Day of December, 2003

JAMES E. ROGAN
*Director of the United States Patent and Trademark Office*